July 18, 1944.  H. E. MALONE  2,353,740

CONTROL APPARATUS

Filed Jan. 19, 1942  2 Sheets-Sheet 1

INVENTOR.
BY HOMER E. MALONE
ATTORNEY

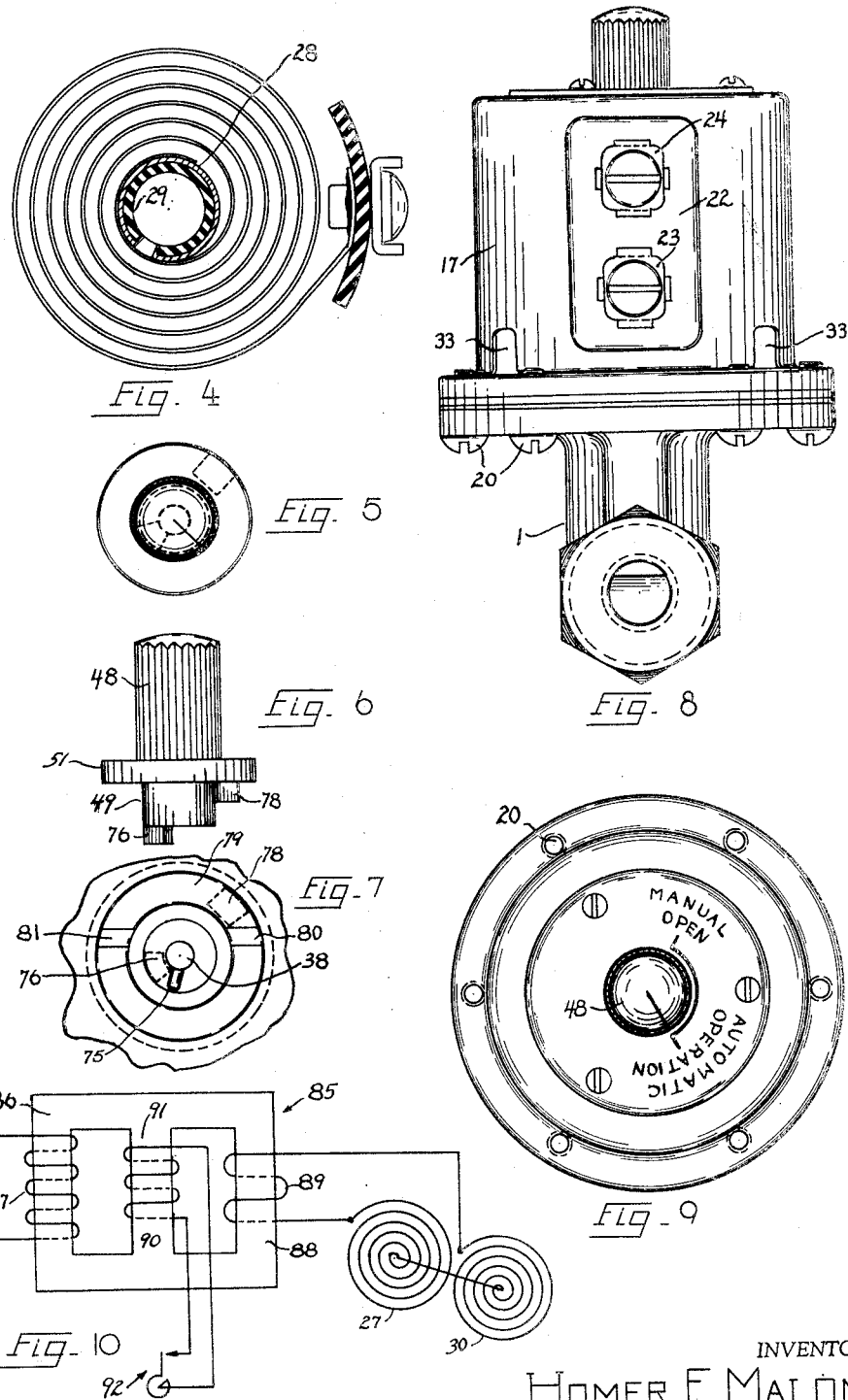

Patented July 18, 1944

2,353,740

UNITED STATES PATENT OFFICE 2,353,740

CONTROL APPARATUS

Homer E. Malone, Milwaukee, Wis., assignor to Perfex Corporation, Milwaukee, Wis., a corporation of Wisconsin Application January 19, 1942, Serial No. 427,255

16 Claims. (Cl. 137—139)

This invention relates in general to automatic controls and more particularly to electrically operated valve mechanism. It is the primary object of this invention to provide a snap acting valve mechanism which is simple, compact and rugged in construction and which is silent and positive in operation.

It is a further object of this invention to provide an improved magnetic snap action mechanism.

A further object of the invention is the provision of an improved slip friction drive mechanism between a condition responsive device and a device actuated thereby.

Other objects of the invention will become apparent from the following description and appended claims.

For a full disclosure of this invention reference is made to the following detailed description, and to the accompanying drawings in which Fig. 1 is a sectional side view of a valve mechanism embodying the present invention;

Fig. 4 is a top view of one of the bimetal elements;

Fig. 5 is a top view of the manual adjusting knob;

Fig. 6 is an elevation of the manual adjusting knob;

Fig. 7 is a fragmentary top view of the casing with the manual adjusting knob removed;

Fig. 8 is an elevation of the control valve;

Fig. 9 is a top view of the control valve; and

Fig. 10 shows diagrammatically a preferred form of control system for the valve.

Figure 1:
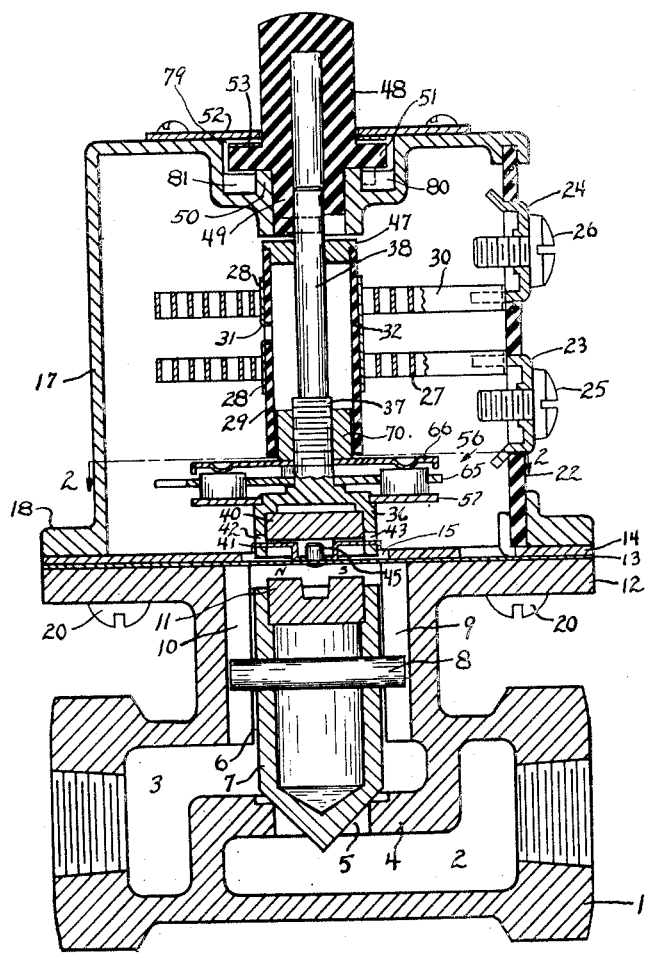

Referring to the drawings, reference character 1 indicates a valve body having an inlet passage 3 and an outlet passage 2 separated by a transverse partition 4 having a valve port 5 therein. The valve body 1 is formed to provide a chamber 6 in alignment with the valve port 5 for receiving a hollow movable valve member 7. This valve member 7 is provided with a means for restraining rotation thereof, this means being shown as a pin 8 which extends transversely of the valve member and which engages guide members 9 and 10 located along the sides of the chamber 6. The upper end of the member 7 carries a permanent magnet 11, this magnet preferably being U-shaped, having north and south poles as indicated.

The valve body 1 is flared outwardly at the top of passage 6 to provide a flange 12, this flange carrying a nonmagnetic diaphragm or sealing member 13 which serves to close off the end of the passage 6 in a fluid-tight manner. On top of the diaphragm 13 is a base plate 14 having a central circular opening 15 and an upstanding tongue or stop member 16 (Fig. 2) which is struck out from the main portion of base plate 14. Mounted on top of base plate 14 is a generally inverted cup-shaped cover 17 having a flange 18 at its bottom. The cover 17 is held in place by screws 20 extending from the flange 12 into the flange 18, these screws also holding the diaphragm 13 in tight engagement with the flange 12 for providing a fluid-tight seal.

The cover 17 is recessed to receive a terminal plate 22 which carries terminal brackets 23 and 24 having terminal screws 25 and 26 respectively for the attachment of electrical wires. Attached to the terminal bracket 23 is a coiled bimetal element 27, the inner end of which is attached to a collar 28 carried by a cylindrical member 29 of insulating material. The terminal bracket 24 carries a bimetal element 30 which may be identical with element 27, the element 30 being attached to the collar 28 on the cylindrical member 29. The collar 28 preferably is provided with an in-turned portion 31 which extends into a recess in the cylindrical member 29, this arrangement causing the collar and cylindrical member to rotate as a unit. It will be apparent that when the terminals 23 and 24 are connected across a source of electrical power an electrical circuit will be completed in series through bimetal elements 27 and 30, this causing the bimetal elements to heat and unwind, rotating the cylindrical member 29 in a counter-clockwise direction as viewed in Fig. 4. When the circuit through the bimetal elements is broken the elements will cool off for twisting the member 29 in a clockwise direction. This cooling of the bimetal elements is accelerated by means of vent openings 33 in the casing 17 (Fig. 8).

Figure 3:
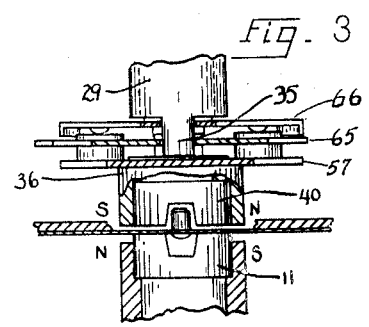
Fig. 3 is a fragmentary side view, partly in section, of the slip friction mechanism and magnet construction.

The lower end of the cylindrical member 29 is recessed as shown in Fig. 3 to provide a pair of diametrically spaced leg portions 35 which rest upon a generally cup-shaped member 36, this cup-shaped member being preferably formed integrally with an upwardly extending shaft having an enlarged screw-threaded portion 37 and a reduced upper portion 38. The cup member 36 receives a permanent magnet 40 which may be identical with the permanent magnet 11 (see Fig. 3). This magnet may be retained in place within the cup member 36 by means of a spring member 41 extending transversely of member 36 and passing through diametically spaced openings 42 and 43 in its side walls. The spring member 42 is inserted in position by flexing the same and the ends are then bent over to retain this member in place. It will be noted the spring member 41 is provided with a downwardly off-set central portion having a circular opening which fits over a pin 45 secured to the diaphragm 13. This arrangement serves as a guide for the cup member 36, permitting this cup member to rotate about pin 45 while preventing lateral movement thereof. The upper end of the cylindrical member 29 receives a spacer 47 having a circular opening through which the upper end of shaft 38 passes. The end of shaft 38 fits loosely into a manual operating knob 48, which knob is formed with a cylindrical guide portion 49 which fits into a guide 50 formed in the top of the cover 17. The operating knob 48 is also formed with an enlarged circular portion 51, the lower surface of which engages the end of guide 50, this knob being held in place by means of a cover plate 52 secured by screws to the top of cover 17. Preferably a spring washer 53 is interposed between the cover plate 52 and the enlarged portion 51, this yieldably urging the knob 48 into engagement with the top of guide 50. This arrangement, it will be noted, provides for pivotal mounting of the cylindrical member 29, both at its upper and lower ends. This arrangement also restrains or prevents axial movement of the cylindrical member 29 and the cup member 36. Thus the permanent magnet 40 is rotatably mounted so as to rotate with respect to the permanent magnet 11, linear or axial movement of the magnet 40 being substantially prevented.

The cylindrical member 29, which is rotated by the thermostatic elements 27 and 30, serves to twist the permanent magnet 40, which causes opening or closing movement of the valve member 7. When the magnet 40 is rotated to the position shown in Fig. 3, it will be observed that the south pole of magnet 40 is adjacent the north pole of magnet 11, and the north pole of magnet 40 is adjacent the south pole of magnet 11. The magnets in this position have their unlike poles adjacent each other with the result that the magnets are attracted toward each other. As the magnet 40 is restrained from downward movement, this magnetic attraction results in upward movement of the magnet 11, thus raising the valve member 7 from the seat 5. This is the position that the parts assume when the bimetal elements 27 and 30 are heated. When the bimetal elements 27 and 30 cool, the sleeve 29 and permanent magnet 40 are rotated in a clockwise direction as viewed in Fig. 4, this causing the north and south poles of the magnet 40 to be rotated away from the south and north poles respectively of magnet 11. At this time, it will be noted, the magnet 11 is prevented from rotating with magnet 40 by the guide means 8—9—10. This rotation of magnet 40 relative to magnet 11 increases the distance between the poles of the two magnets, thereby diminishing the attractive force. As the magnet 40 continues to rotate, the attractive force will diminish to a point wherein it is overcome by the weight of the valve member 7 and thus the valve member will drop against its seat. Upon still further rotation of the magnet 40, the north pole of this magnet will approach the north pole of magnet 11. Thus the like poles of the two magnets will become adjacent each other, thereby causing the magnets to repel each other, which applies an additional closing force to the valve member 7. It will be apparent that as the permanent magnet 40 is rotated in the opposite direction, due to heating of the bimetal elements, this repelling force will first be reduced to zero as the magnet 40 approaches the position shown in Fig. 1 wherein it is 90° from magnet 11. Upon continued rotation of the magnet 40 the unlike poles of the magnets will become closer and closer together, thereby increasing the magnetic attraction until it overcomes the weight of the valve member 7. The valve member 7 will thus be lifted and as it rises the distance between magnets 11 and 40 will be decreased, which further increases the magnetic attraction. This causes the valve to travel with snap action from closed position to wide open position once the valve begins moving away from closed position.

Figure 2:
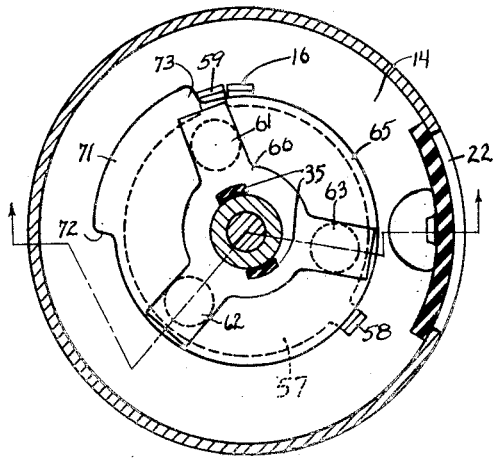
Fig. 2 is a sectional view showing the slip friction mechanism and taken on line 2—2 of Fig. 1.

While the device would be operative with a rigid connection between sleeve 29 and magnet 40, it is preferable to employ a slip friction drive arrangement between these two parts. This slip friction drive mechanism makes the valve respond quicker to energization or deenergization of the bimetal elements, and also avoids any possible straining of the bimetal elements. The slip friction drive means is indicated generally by reference character 56. This mechanism includes a friction plate 57 which is staked to a shoulder of the cup member 36. This friction plate 57 is generally circular in shape and is provided with two upstanding portions or drive members 58 and 59 (Fig. 2). The friction plate 57 is engaged by and carries friction pads 61, 62 and 63, these friction pads passing through openings in a drive plate 65. A resilient spider or spring member 66 serves to press the friction pads into engagement with the friction plate 57. As shown in Fig. 3, the leg portions 35 of the cylindrical member 29 pass through coinciding openings in the spider member 66 and the drive plate 65. By this arrangement the spider member 66 and drive plate 65 rotate as a unit with the member 29. Referring to Fig. 1, it will be noted that the tension of the spider or spring member 66 may be adjusted by means of a nut 70 which is screwed on the screw threaded shaft portion 37. This nut 70 bears against the spider 66, serving to press the friction pads into engagement with the friction plate 57.

As shown more clearly in Fig. 2, the drive plate 65 is provided with an enlarged portion 71, this forming positive drive surfaces 72 and 73 at the ends thereof, these drive surfaces being adapted to cooperate with the drive members 58 and 59 respectively. With the parts in the positions shown in Figs. 1 and 2, the bimetal elements 27 and 30 are cold, having positioned the cylindrical member 29 in its extreme clockwise position as viewed in Fig. 2. In this position the drive member 65 has been rotated clockwise, the drive surface 73 thereof having engaged the drive or stop member 59 which now engages the stop 16 projecting from the stationary plate 14. This has caused the permanent magnet 40 to be rotated to a position in which its north pole is near the north pole of the permanent magnet 11, this providing a repelling action between the permanent magnets for urging the valve member 7 against its seat. When an electric current is passed through the bimetal elements 27 and 30, these elements heat up for rotating the member 29, causing counter-clockwise rotation of drive plate 65 as viewed in Fig. 2. This rotates the friction pads 61, 62 and 63 counter-clockwise for imparting the same rotation to friction plate 57 and permanent magnet 40. At this time it will be noted that the drive surface 73 of the drive member 71 is moving ahead of member 59 and thus does not interfere with counter-clockwise movement of the member 59. This counter-clockwise rotation of magnet 40 first causes this magnet to pass through a position in which the magnets 40 and 11 are 90° apart. Thus initial movement of magnet 40 results in decreasing the repelling forces between magnets 40 and 11 to zero. Upon continued counter-clockwise rotation of magnet 40, the north pole of this magnet will approach the south pole of magnet 11, and thus the magnets 40 and 11 begin attracting each other. This attraction increases as the permanent magnet 40 continues to rotate, until finally the force of magnetic attraction becomes sufficient to lift the valve member 7 from its seat. This usually occurs some time before the parts reach the position shown in Fig. 3 wherein the north pole of magnet 40 is in alignment with the south pole of magnet 11. When the friction member 57 is driven to the position shown in Fig. 3 the leading edge of the drive or stop member 58 engages the left hand edge of the stop 16. This prevents the magnet 40 from continuing rotation, which if permitted might cause the valve to reclose. After the stop or drive member 58 engages the stop 16 for preventing further rotation of the friction plate 57, continued movement of the friction pads merely causes them to slip over the surface of this plate. When the electric circuit through the bimetal elements is broken, these elements begin cooling down, causing clockwise rotation of the member 29 which drives the drive plate 65 clockwise, as seen in Fig. 2. This movement of the drive plate 65 is transmitted immediately to the friction plate 57 by the friction pads, thus moving the permanent magnet 40 away from the position shown in Fig. 3 for decreasing the attractive force between magnets 40 and 11. Eventually a point is reached wherein the attractive force between the magnets is insufficient to hold the valve member 7 in raised position. The valve member thus drops to its seat with snap action. As the bimetal elements continue to cool, the stop member 59 will engage the stationary stop member 16, which prevents further clockwise rotation of the permanent magnet 40. Continuing cooling of the bimetal elements will result in continued clockwise rotation of the drive member 65, this movement being permitted by slipping of the friction pads upon the friction plate 57. Finally upon further cooling of the bimetal elements, the drive surface 73 of the drive member 65 may engage the stop member 59, the parts again assuming the positions shown in Fig. 2.

From the above description it will be apparent that the slip friction drive arrangement causes the permanent magnet 40 to be rotated immediately upon initial heating movement of the bimetal elements and also upon initial cooling movement of the bimetal elements, this immediate movement of the permanent magnet with the bimetal element occurring irrespective of the actual temperature of the bimetal elements. This slip friction arrangement thus makes the valve operate promptly in response to energization of the heating means for the bimetal elements. In addition, this slip friction drive arrangement provides for preventing the magnet 40 from being rotated too far in either direction and avoids straining of the bimetal elements.

In the event that the slip friction drive mechanism should fail, the arrangement of the present invention provides for a positive drive between the bimetal elements and the magnet 40. Thus if for some reason, counter-clockwise movement of drive plate 65 is not transmitted to the friction plate 57 through the friction pads, the drive surface 72 of plate 65 will eventually engage the drive member 58 of the friction plate 57. Further counter-clockwise rotation of the drive plate 65 will now cause corresponding counter-clockwise rotation of the friction plate 57 and permanent magnet 40. Similarly if clockwise rotation of drive plate 65 is not transmitted to the friction plate 57 through the friction pads, the drive surface 73 will eventually engage the drive member 59, thereby providing a positive clockwise drive of plate 57.

It should be noted that the positive drive surfaces 72 and 73 cooperating with members 58 and 59 respectively, in addition to providing protection against failure of the slip friction mechanism, also insure against the valve getting out of step due to changes in ambient temperature. Thus when the bimetal elements 27 and 30 are unheated and below a predetermined design temperature such as 110° F., the parts will assume the positions shown in which the valve is closed. Thus changes in ambient temperature below 110° F. cannot cause opening of the valve. Similarly, when the bimetal elements are heated above a predetermined temperature such as 300° F., the drive surface 72 by engagement with member 58 will keep the valve open irrespective of reversals in temperature of the bimetal elements occurring above this value. Thus it is insured that the valve will be closed when deenergized and open when energized.

In certain applications of the invention it is desirable to provide an arrangement for operating the valve manually. For example during a period of failure of electric power, it may be desirable to open the valve, which requires a manual operating means. In the form of the invention illustrated, the knob 48 serves to permit manual rotation of the shaft 38 which directly rotates the permanent magnet 40. Referring to Fig. 7, it will be noted that the shaft 38 is provided with a pin 75. This pin is adapted to be engaged by a downwardly extending projection 76 formed on the knob 48 (Fig. 6). When the knob 48 is turned to the position shown in Fig. 9 in which the pointer 50 is at "automatic operation" the projection 76 is in the position shown in dotted lines in Fig. 7. It will be noted that with this position of the projection 76 relative to pin 75, the projection 76 does not interfere with counter-clockwise movement of the shaft 38. Thus the valve is permitted to operate automatically in the manner above described. However when the knob 48 is rotated counter-clockwise to the position "manual open," as seen in Fig. 9, the projection 76 engages the pin 75 causing counter-clockwise rotation of shaft 38 with knob 48, this rotating the permanent magnet 40 so as to open the valve. When the knob 48 is rotated counter-clockwise from its position "automatic operation" to its position "manual open," the bimetal elements 27 and 30 are stressed slightly, these elements yieldably resisting such counter-clockwise rotation of the shaft 38. When the knob 48 is rotated clockwise to its position "automatic operation," the force stored up in the bimetal elements serves to rotate the shaft 38 through the slip friction mechanism. Thus the stress stored up in the bimetal elements serves to return the permanent magnet 40 to a position causing closure of the valve.

Preferably the movement of the knob 48 is limited by suitable stop means. This stop means in its preferred form may consist of a projection 78 formed on knob 48, this projection 78 being shown in dotted lines in Fig. 7. When the knob 48 is in place, the projection 78 fits into an annular slot 79 formed in the top of casing 17. The projection 78 engages a web 80 extending across the annular slot 79 when the knob 48 is in its "automatic operation" position. When the knob 78 is rotated to its "manual open" position, the projection 78 engages a second web 81 for preventing further rotation in this direction.

The electric circuit through the bimetal elements 27 and 30 may be controlled in any suitable manner. Preferably the control circuit includes a three-legged transformer generally indicated as 85. The transformer 85 includes a first leg 86 having a primary coil 87 wound thereon, this coil being adapted to be connected continuously across a 110 volt power line. The transformer 85 also includes a secondary leg 88 having a secondary coil 89 wound thereon, this secondary coil being permanently connected to the bimetal elements 27 and 30. The transformer 85 further includes a control leg 90 having a control winding 91 wound thereon. This control winding is preferably wound so that a voltage of approximately 20 volts is induced therein. This winding 91 is adapted to be short-circuited by any suitable switching mechanism such as a thermostat 92. When the switch 92 is open, the circuit through the control winding 91 is opened and consequently this winding does not resist travel of magnetic flux through the leg 90. This leg thus acts as a magnetic shunt for the secondary leg 88. Thus the flux induced in the transformer core by the primary 87 is shunted through leg 90. As a result very little flux cuts the secondary winding 89. Thus when the switch 92 is open, the current flow through the bimetal elements is substantially zero. However, when the switch 92 is closed, the winding 91 becomes short-circuited which causes this winding to produce a flux in opposition to that induced by the primary coil 87. This causes a large portion of the flux induced by coil 87 to pass through the transformer leg 88 and cut the secondary coil 89, with the result that a low voltage, high amperage current is passed through the bimetal elements 27 and 30 for heating the same. As described above, this causes opening of the valve.

From the foregoing description, it will be apparent that the present invention provides a simple and positive arrangement for providing snap action movement of a valve or other type of movable member. While a preferred form of the invention has been shown and described, it will be apparent that many changes may be made without departing from the scope of the invention. For example, the magnetic snap action mechanism or motion transmitting means may be employed for operating other movable members than valves and may be operated by other operators than manual operators or thermostatic actuators. It will also be apparent that various features disclosed have utility apart from the complete combination shown. It is therefore desired to be limited only by the scope of the appended claims.

What is claimed is:

1. In combination, a first magnet, a second magnet, said magnets being located adjacent each other so as to be influenced by each others magnetic field, the polarity of said magnets being constant relative to each other, means providing for two types of relative movement between the magnets, one type of relative movement being predominantly linear and the other type of movement being predominantly twisting, a first movable member actuated by one type of relative movement between the magnets, a second movable member for imparting the other type of relative movement to said magnets, a condition responsive device for actuating said second movable member, and a slip friction drive mechanism between said condition responsive device and said second movable member.

2. In combination, a first magnet, a second magnet, said magnets being located adjacent each other so as to be influenced by each others magnetic field, the polarity of said magnets being constant relative to each other, a first movable member actuated by one of said magnets, a second movable member for actuating one of said magnets relative to the other, means for limiting movement of said second movable member, a condition responsive device for actuating said second movable member, a slip friction drive mechanism between said condition responsive device and said second movable member, and a positive lost motion type drive mechanism also between said condition responsive means and said second movable member.

3. In combination, a first movable member, magnetic means for actuating said first movable member, a second movable member for actuating said magnetic means, means for limiting movement of said second movable member, a condition responsive device for actuating said second movable member, a slip friction drive mechanism between said condition responsive device and said second movable member, and a positive lost motion type drive mechanism also between said condition responsive means and said second movable member.

4. In combination, a movable member, means for limiting movement of said movable member, a condition responsive device for actuating said movable member, a slip friction drive mechanism between said condition responsive device and said movable member, and a positive lost motion type drive mechanism also between said condition responsive means and said movable member.

5. In combination, a valve port, a valve member associated with said valve port and movable linearly toward or away from said valve port, a rotatable member, a condition responsive device for rotating said rotatable member, and magnetic snap action motion translating means for translating rotary movement of said rotatable member into snap action linear movement of said valve member.

6. In combination, a valve body having inlet and outlet passages communicating through a valve port, said valve body also having an open ended chamber in alignment with the valve port, a valve member for said valve port and located at least in part within said chamber, guide means for said valve member arranged to permit linear motion thereof toward or away from the valve port while restraining rotary motion thereof, a first permanent magnet attached to the end of the valve member remote from the valve seat, a flat non-magnetic seal member for closing the open end of said chamber, a second permanent magnet pivotally mounted at the outside of said seal member and restrained from linear motion, and means for rotating said second permanent magnet.

7. In combination, a valve body having inlet and outlet passages communicating through a valve port, said valve body also having an open ended chamber in alignment with the valve port, a valve member for said valve port and located at least in part within said chamber, guide means for said valve member arranged to permit linear motion thereof toward or away from the valve port while restraining rotary motion thereof, a first permanent magnet attached to the end of the valve member remote from the valve seat, a flat non-magnetic seal member for closing the open end of said chamber, a second permanent magnet pivotally mounted at the outside of said seal member and restrained from linear motion, a coiled bimetal strip having electric heating means therefor, a shaft rotated by said bimetal strip, a slip friction drive mechanism between said shaft and said second permanent magnet, and means for rotating the second permanent magnet independently of said slip friction drive mechanism.

8. In combination, a valve port, a valve member associated with said valve port and movable linearly toward or away from said valve port, a rotatable member, and magnetic snap action motion translating means for translating rotary movement of said rotatable member into snap action linear movement of said valve member.

9. In combination, a valve port, valve member means associated with said valve port and movable linearly toward or away from said valve port, said valve member means including a permanent magnet, means for restraining rotary movement of said valve member means, a rotatable permanent magnet arranged to influence the first mentioned permanent magnet, and means for restraining linear movement of said rotatable permanent magnet.

10. In combination, a valve port, valve member means associated with said valve port and movable linearly toward or away from said valve port, said valve member means including a permanent magnet, a second permanent magnet arranged to influence the first mentioned permanent magnet, means for rotating one of said permanent magnets, and means restraining rotary movement of the other of said permanent magnets.

11. In combination, a valve port, valve member means associated with said valve port for controlling the flow of fluid therethrough, said valve member means including a permanent magnet, a second permanent magnet cooperating with said first mentioned permanent magnet, means for rotating one of said permanent magnets, and means for restraining rotation of the other of said permanent magnets.

12. In combination, a valve port, valve member means associated with said valve port for controlling the flow of fluid therethrough, said valve member means including a permanent magnet, a second permanent magnet cooperating with said first mentioned permanent magnet, means for providing for linear relative movement between the magnets and twisting relative movement between the magnets, one of said relative movements operating the valve member means to vary the flow of fluid through the valve port, and means for imparting the other of said relative movements between the magnets.

13. In combination, a valve port, valve member means associated with said valve port for controlling the flow of fluid therethrough, said valve member means including a permanent magnet, a second permanent magnet cooperating with said first mentioned permanent magnet, means for providing for linear relative movement between the magnets and twisting relative movement between the magnets, one of said relative movements operating the valve member means to vary the flow of fluid through the valve port, and means for actuating the second magnet in a manner imparting the other relative movement between the magnets.

14. In combination, a unitary structure providing a first guide means and a second guide means in permanent fixed relationship with each other, a first movable member associated with the first guide means in a manner permitting linear movement of said first movable member while restraining rotary movement thereof, a permanent magnet attached to and carried by said first movable member, a second movable member associated with the second guide means and in alignment with the first movable member, said second movable member being restrained from linear movement but being rotatable, and a second permanent magnet adjacent the first permanent magnet and attached to the second movable member.

15. In combination, a unitary structure providing a first guide means and a second guide means in permanent fixed relationship with each other, a first permanent magnet member associated with the first guide means in a manner providing for linear movement while restraining rotary movement, and a second permanent magnet member adjacent the first permanent magnet member and associated with the second guide means in a manner providing for rotary movement while restraining linear movement.

16. In combination, a unitary structure providing a first guide means and a second guide means in permanent fixed relationship with each other, a first permanent magnet member associated with the first guide means in a manner providing for linear movement while restraining rotary movement, a second permanent magnet member adjacent the first permanent magnet member and associated with the second guide means in a manner providing for rotary movement while restraining linear movement, and means for rotating the second permanent magnet member to cause snap action linear movement of the first permanent magnet member.

HOMER E. MALONE.